Apr. 24, 1923.
P. TARGOSKY
1,452,625
COMBINED SEEDING MACHINE AND MANURE SPREADER
Filed Aug. 23, 1920
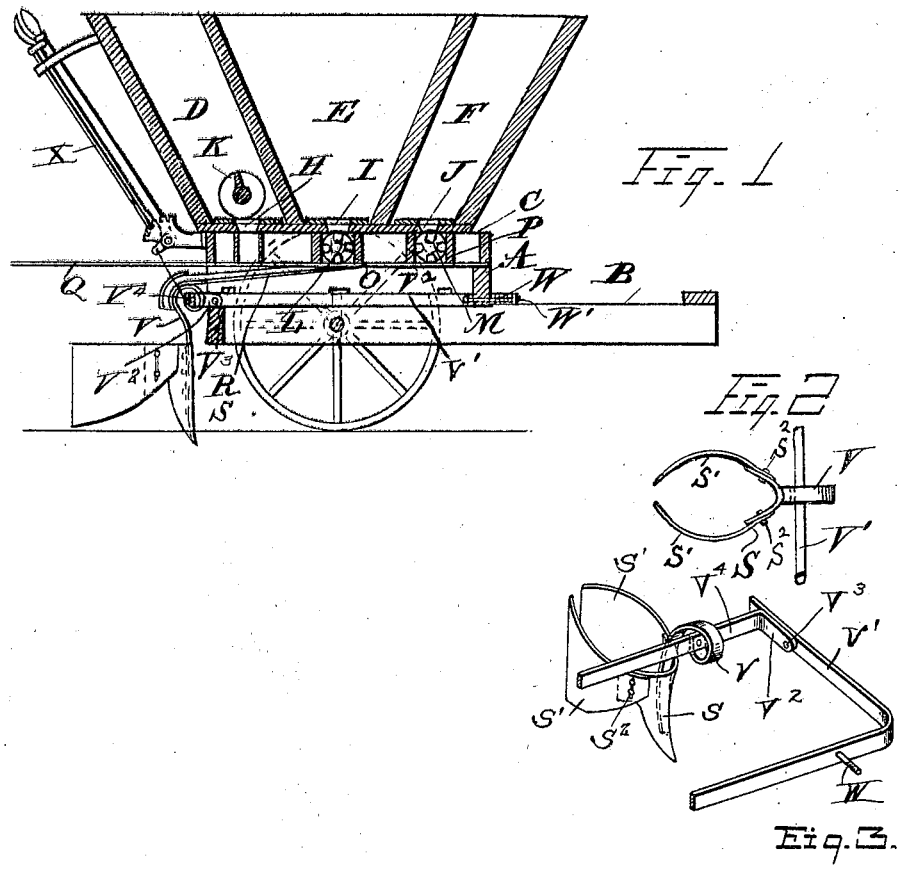
INVENTOR
Peter Targosky
BY
ATTORNEY Patented Apr. 24, 1923.

1,452,625

UNITED STATES PATENT OFFICE.

PETER TARGOSKY, OF CLEVELAND, OHIO.

COMBINED SEEDING MACHINE AND MANURE SPREADER.

Application filed August 23, 1920. Serial No. 405,268.

*To all whom it may concern:*

Be it known that I, PETER TARGOSKY, a citizen of the United States, and resident of Cleveland, in the county of Cuyahoga and State of Ohio, have invented certain new and useful Improvements in Combined Seeding Machines and Manure Spreaders, of which I hereby declare the following to be a full, clear, and exact description, such as will enable others skilled in the art to which it appertains to make and use the same.

The invention relates to a combined seeding machine and manure spreader.

The object of the present invention is to provide a simple, practical and efficient combined seeding machine and manure spreader of comparatively inexpensive construction adapted to drill grain and fertilizer and capable of also being arranged for spreading seed such as meadow or pasture grass and manure broadcast and of also packing the surface and of making the same suitable for the growth of the seed.

With these and other objects in view, the invention consists in the novel construction, combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention:

In the drawings in which like characters of reference designate corresponding parts in the several figures:

Figure 1 is a central longitudinal sectional view of a combined seeding machine and manure spreader constructed in accordance with this invention.

Figure 2 is a detail plan view of one of the drills.

Figure 3 is a detail perspective view of the removable frame.

In the accompanying drawings in which is illustrated the preferred embodiment of the invention, the combined machine comprises in its construction a frame or truck A mounted upon a pair of wheels and adapted to be drawn over a field by a suitable tongue or drawbar B. The carrying wheels are mounted on the ends of an axle B' and the frame A is provided with a platform C upon which are mounted rear, central and front hoppers D, E and F. The rear hopper D is designed for finely ground fertilizer such as bone meal or phosphate, the central hopper E is designed for contents containing seed to be drilled such as oats or onion seed and the front hopper F is designed to contain either seed or pulverized manure or other fertilizer to be sowed broadcast. The central hopper E is provided with front and rear inclined walls and the front and rear hoppers are inclined to correspond to the inclination of the walls by the central hopper. These hoppers are provided with tapered feed openings H, I and J formed in the platform C.

Over the rear opening H in the fertilizer hopper revolves a feed screw K for feeding the fertilizer uniformly to the spaced openings H of the rear hopper. Under the feed openings I and J of the central and front hoppers E and F are mounted feed rollers L and M, which are provided with radial grooves or receptacles in their peripheries into which the material from the hoppers passes and by means of which feed rollers proportions of the materials are accurately made so that the proper amount is deposited, each time from each opening.

These feed rollers revolve in passages O and P in the platform C beneath the central and front hoppers relatively and feed slides G are arranged in pairs beneath the openings of the front, rear and central hoppers for cutting off the flow of material from the hoppers when the machine is not in use, or from any of the hoppers when a change in spacing the rows is desired, or for any other purpose.

Inclined chutes R are located beneath the central and rear hoppers and are hinged at their front ends and are provided with downwardly curved rear portions. These inclined chutes extend beneath the openings of the central and rear hoppers and are adapted to receive the material discharged from the same and as the fertilizer is contained in the rear hopper, such material would be dropped in advance of the seed from the central hopper. The curved terminal portions at the inclined spouts discharge the feed and fertilizer in rear of drills S which are yieldably mounted upon spiral springs V secured at intervals to a transverse bar or member $V^4$ of a horizontal frame V' and the said springs which connect the drills with the frame are adapted to prevent the drills from being broken by encountering stones or roots embedded in the ground. These drills are provided with rearwardly extending side wings S' and are curved longitudinally of the machine and present inner concave faces and outer convex faces and the front and rear portions converge as clearly illustrated in Figure 2 of the drawing. The side wings S' are adapted to draw the soil over the seed and fertilizer dropped into the grooves made by the drills S. The wings S' are preferably adjustable vertically at $S^2$ to control the amount of earth used in covering the grooves made in the ground by the drill.

The frame V' is slidable into and out of position on the frame or truck A which is provided with guides and to which the frame V' is detachably secured by bolts W' which pass through a front transverse bar W. The bolts have removable nuts and when the nuts are removed the frame V' may be moved rearwardly along the guides of the frame or truck A. This frame V' is substantially oblong and consists of a front transverse bar or member and integral side bars or members between the rear portions of which are pivoted the terminals of a rear transverse bar or member. The springs V are secured to this rear transverse bar or member which is provided with forwardly bent terminals or arms $V^2$ pivoted at $V^3$ to the side bars of the frame V'. This pivoting of the rear transverse bar or member upon which the drills are mounted enables the drills to be raised and lower by means of a lever X pivoted at the rear of the machine and having suitable connections with the pivoted rear transverse bar $V^4$, so that upon operation of the lever X the bar $V^4$ is lifted and in view of the fact that the drills are carried by the bar $V^4$, it will be seen that the drills will be lifted to pass over obstacles and also when the machine is not in use and to regulate the depth of the grooves made by the drills. As clearly illustrated in Figure 1 of the drawings the hinged chute or spout R has its rear portion arranged upon and conforming to the configuration of the coiled spring V. This will enable the lever X to raise and lower the drills and the hinged chutes.

What is claimed is:

1. A machine of the class described comprising a plurality of hoppers, a chute leading from the said hoppers, a slidably removable frame beneath the hoppers carrying a resiliently mounted drill thereon adjacent one end of the chute and means for raising and lowering said drill.

2. A machine of the class described comprising hoppers, a chute leading therefrom, a horizontal slidably removable frame having a pivoted extension thereon, a drill resiliently mounted on the pivoted extension whereby the same may be raised or lowered and means for operating the drill.

3. A machine of the class described comprising hoppers and a chute, a horizontal slidably removable frame provided with a pivoted extension connected thereto mounted below the said hoppers, a drill, a spring secured to the said pivoted extension and to the drill whereby the same is yieldingly supported, means for raising and lowering the said drill and means comprising a nut and bolt for locking the said frame in position.

4. A machine of the class described comprising hoppers and a chute, a longitudinal slidably removable frame carrying a pivoted extension at one end thereof, a drill, supporting means including a spring for the drill, the said chute resting on the spring and mounted for pivotal movement, and means for raising and lowering the drill whereby the chute will be raised and feeding of the material therefrom arrested.

In testimony whereof, I hereunto set my hand this 19th day of June 1920.

PETER TARGOSKY.

In presence of—
Wm. M. Monroe,
L. L. Marshall.